United States Patent
Schoenbach et al.

(10) Patent No.: US 10,967,766 B2
(45) Date of Patent: Apr. 6, 2021

(54) ENERGY ABSORBER FOR A VEHICLE SEAT, LINEAR ADJUSTER FOR A VEHICLE SEAT HAVING AN ENERGY ABSORBER, AND VEHICLE SEAT

(71) Applicant: Adient Luxembourg Holding S.á r.l., Luxembourg (LU)

(72) Inventors: Roland Schoenbach, Bergisch Gladbach (DE); Andreas Hoffmann, Wuelfrath (DE)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 89 days.

(21) Appl. No.: 16/332,615

(22) PCT Filed: Sep. 5, 2017

(86) PCT No.: PCT/EP2017/072150
§ 371 (c)(1),
(2) Date: Mar. 12, 2019

(87) PCT Pub. No.: WO2018/050476
PCT Pub. Date: Mar. 22, 2018

(65) Prior Publication Data
US 2020/0198505 A1    Jun. 25, 2020

(30) Foreign Application Priority Data
Sep. 13, 2016   (DE) .................... 10 2016 217 405.3

(51) Int. Cl.
*B60N 2/427* (2006.01)
*B60N 2/06* (2006.01)
*B60N 2/68* (2006.01)

(52) U.S. Cl.
CPC ......... *B60N 2/42709* (2013.01); *B60N 2/067* (2013.01); *B60N 2/68* (2013.01)

(58) Field of Classification Search
CPC .............. B60N 2/4228; B60N 2/42745; B60N 2/42709; B60N 2/68; B60N 2/067;
(Continued)

(56) References Cited

U.S. PATENT DOCUMENTS

2008/0100104 A1* 5/2008 Axelsson ............... B60N 2/433
297/216.1
2009/0001786 A1* 1/2009 Haglund ................ B60N 2/233
297/216.14
(Continued)

FOREIGN PATENT DOCUMENTS

DE         198 07 581 A1    9/1998
DE   10 2004 032 785 A1    2/2006
(Continued)

*Primary Examiner* — Robert A. Siconolfi
*Assistant Examiner* — San M Aung
(74) *Attorney, Agent, or Firm* — Marshall & Melhorn, LLC

(57) ABSTRACT

An energy absorber (100) for a vehicle seat (1), in particular for a linear adjuster (60) of the vehicle seat (1), includes a deformation element (110). The deformation element (110) is deformable by forces occurring in a vehicle collision. The energy absorber (100) includes a bending element (120) that releases the deformation element (110). Upon achieving a bending load acting on the bending element (120), the bending element (120) bends and the bending element (120) thereby releases the deformation element (110) to a lesser extent. A linear adjuster (60) for a vehicle seat (1) is also provided, having the energy absorber (100). Further, a vehicle seat (1) is provided having at least such one linear adjuster (60).

6 Claims, 2 Drawing Sheets

(58) Field of Classification Search
CPC ...... B60N 2/0203; B60N 2/165; B60N 2/161;
B60N 2/42727; B60N 2/16; B60N
2/0232; B60N 2/4214; B60N 2002/024;
B60N 2/888; B60N 2/42781; B64D
11/06; B64D 11/0619
USPC ....................................... 188/371; 297/216.1
See application file for complete search history.

(56) References Cited

U.S. PATENT DOCUMENTS

2011/0079681 A1* 4/2011 Honnorat ........... B64D 11/0619
244/122 R
2014/0361586 A1* 12/2014 Fornecker .............. B64D 11/06
297/216.1
2017/0259713 A1* 9/2017 Kostin ................. B60N 2/0232

FOREIGN PATENT DOCUMENTS

| DE | 20 2007 006 910 U1 | 9/2008 |
|----|---------------------|--------|
| DE | 10 2007 018715 A1  | 10/2008 |
| DE | 10 2010 029 129 A1 | 11/2011 |
| WO | 2010/020567 A1     | 2/2010 |

\* cited by examiner

ENERGY ABSORBER FOR A VEHICLE SEAT, LINEAR ADJUSTER FOR A VEHICLE SEAT HAVING AN ENERGY ABSORBER, AND VEHICLE SEAT

CROSS REFERENCE TO RELATED APPLICATIONS

This application is a United States National Phase Application of International Application PCT/EP2017/072150, filed Sep. 5, 2017, and claims the benefit of priority under 35 U.S.C. § 119 of German Application 10 2016 217 405.3, filed Sep. 13, 2016, the entire contents of which are incorporated herein by reference.

TECHNICAL FIELD

The invention relates to an energy absorber for a vehicle seat, in particular for a linear adjuster of the vehicle seat, the energy absorber comprising a deformation element which can be deformed by forces occurring in a vehicle collision. The invention further relates to a linear adjuster for a vehicle seat having such an energy absorber and a vehicle seat.

TECHNICAL BACKGROUND

An energy absorbing device for a vehicle seat is disclosed in DE 198 07 581 A1, said energy absorbing device comprising a separate and removable deformation element which comprises at least one deformation region, wherein the deformation region is capable of being deformed in the event of a collision and thereby absorbing energy.

A vehicle seat having a substantially vertically arranged seat backrest and a substantially horizontally arranged seat surface is disclosed in DE 10 2004 032 785 A1, said vehicle seat having an adjusting device for adjusting the relative position of the seat backrest to the seat surface, wherein the adjusting device comprises a set deformation means which at least partially absorbs the forces occurring in the event of an accident.

DE 10 2010 029 129 A1 discloses a height adjusting device for motor vehicle seats having a control unit which is capable of adjusting and supporting a seat structure relative to a seat floor assembly, which is able to be altered in terms of length and which is able to be connected in an articulated manner at one end to the seat structure and at the other end to the seat floor assembly, wherein the control unit is configured at one end and/or at both ends so as to be mounted relative to the seat structure and/or seat floor assembly by a rotary joint and so as to be displaceable in the event of an impact.

DE 20 2007 006 910 U1 discloses a seat height adjusting device having a seat carrier, a fastening carrier and a pivoting carrier, wherein the pivoting carrier in each case is pivotably articulated to the seat carrier and the fastening carrier, as well as a push element which is movable in a translatory direction and which is coupled to the pivoting carrier via a rotary bearing with a bearing point, wherein the rotary bearing is designed for the displacement of its bearing point in the translatory direction when the action of a critical force is exceeded.

DE 198 07 581 A1 discloses a method for absorbing energy in a motor vehicle seat in the event of a collision, wherein a releasable deformation element is attached in or on the vehicle seat, and the deformation element comprises at least one deformation region which is capable of being deformed in the event of a collision and thereby absorbing energy.

From the prior art, further energy absorbers in vehicle seats are known from use. The physical principle of the energy absorbers is that, in the event of a vehicle collision, kinetic energy is converted into deformation energy. Typically, energy absorbers are plastically deformed or tear during the vehicle collision. The properties of the components and material are almost fully utilized. In normal operation of the vehicle seat, the energy absorbers are not subjected to any plastic deformation. Only in the case of overloading are the deformation elements deformed or torn and, as a result, the load is reduced on the occupants in order to avoid serious injuries to the occupants.

WO 2010/020567 A1 discloses a subframe of a motor vehicle seat with two rail pairs, two front rockers, two rear rockers and a seat carrier which comprises two side parts, a front crossmember and a rear crossmember, wherein each rail pair is connected in an articulated manner via a front rocker and a rear rocker to a side part, and a linear adjuster configured as a control drive is provided for the height adjustment of the seat carrier, wherein a rocker is connected to a transverse piece and the transverse piece has an articulated region. The articulated region is connected in an articulated manner to one end of a spindle of the control drive.

SUMMARY

An object of the invention is to improve an energy absorber of the type mentioned in the introduction, in particular to be able to adjust in a targeted manner a triggering force of the energy absorber. Additionally, a force path is intended to be adjustable structurally in a targeted manner when the energy absorber is deformed. In particular, an occupant of a vehicle seat which comprises a linear adjuster is designed to be protected from whiplash injury in the event of a rear impact, by energy being dissipated in a targeted manner in a height adjuster comprising a spindle drive. Additionally, a linear adjuster is intended to be provided with an energy absorber according to the invention.

This object is achieved according to the invention by an energy absorber for a vehicle seat, in particular for a linear adjuster of the vehicle seat, the energy absorber comprising a deformation element which can be deformed by forces occurring in a vehicle collision, wherein the energy absorber comprises a bending element which releases the deformation element, wherein, upon achieving a bending load acting on the bending element, the bending element bends and the bending element thereby releases the deformation element to a lesser extent.

As the energy absorber comprises a bending element releasing the deformation element, wherein, upon achieving a bending load acting on the bending element, the bending element bends and the bending element thereby releases the deformation element to a lesser extent, the start of the intended energy conversion may be adjusted structurally in a targeted manner.

"Linear adjuster" is understood as an adjusting component which is articulated, on the one hand, at a first point of articulation to a structural component of the vehicle seat or a further component and, on the other hand, at a second point of articulation to a further structural component of the vehicle seat or a further component, wherein by means of the linear adjuster a spacing between the first point of articulation and the second point of articulation is adjustable, wherein the two points of articulation move in a substantially linear manner relative to one another. Examples of linear adjusters are seat rails and spindle drives.

"Bending load" is understood as the amount of compressive force acting on the bending element which effects the bending of the bending element. As a result of the bending, the bending element may absorb only compressive forces which are substantially smaller than the bending load.

The deformation element according to the invention may be arranged such that it acts in the pushing direction of the linear adjuster. Alternatively, by a mirrored arrangement the deformation element may be arranged such that it acts in the pulling direction of the linear adjuster. Two deformation elements may be combined together such that a limiting of the load and an energy conversion may take place both in the pushing direction and in the pulling direction of the linear adjuster.

Preferably, in normal operation of the vehicle seat the bending element spans the deformation element. This means that in normal operation of the vehicle seat a force exclusively flows via the bending element, and in the case of a vehicle collision the force only flows via the deformation element chronologically after the bending element has already been bent.

Preferably, the bending element and the deformation element are arranged adjacent to one another. Adjacent to one another means, in particular, adjacent to one another in a transverse direction.

Preferably, the deformation element is deformable only after the bending element has been bent. Before the bending, the deformation element may be outside the flux of force.

For attaching the deformation element, in particular the linear adjuster, to a structural component or a further component of the vehicle seat, a bushing and/or a fastening means may be passed through the bending element and the deformation element.

The bending element preferably has a predetermined bending point. In principle, all of the predetermined bending points of pressure rods known from the prior art are able to be used, in particular recesses, wave-shaped recesses, hole patterns, slots or constrictions.

The deformation element preferably has a base body. Means for the targeted weakening of the base body may be incorporated in the base body, in particular geometries which promote the deformation of the base body. These geometries may be configured as slots, stamped portions, lamellae, recesses or constrictions. A plurality of such geometries arranged in series increase the deformation path and the energy which may be dissipated.

The object is additionally achieved according to the invention by a linear adjuster for a vehicle seat having an energy absorber according to the invention. In this case, the energy absorber may be arranged in a region of a point of articulation of the linear adjuster. A separately configured energy absorber may be provided at both points of articulation of a linear adjuster. Depending on the alignment of the bending element and the deformation element in the linear adjuster, the energy absorber may limit compressive forces or tensile forces. By arranging two opposingly aligned energy absorbers, both tensile forces and compressive forces may be limited. Alternatively, an energy absorber according to the invention may be arranged between a first point of articulation of a linear adjuster and a second point of articulation of a linear adjuster.

The object is additionally achieved according to the invention by a vehicle seat having at least one linear adjuster according to the invention. An occupant of such a vehicle seat is protected, in particular, against whiplash injury in the event of a rear impact, by energy being dissipated in a targeted manner in the vehicle seat.

In summary and in other words, the invention relates amongst other things to an optimizing of a seat structure, in particular relative to performance relative to whiplash. The invention may be used, for example, in a linear adjuster which is configured as an electrical spindle height adjuster. A height adjuster of a vehicle seat generally comprises a spindle and a spindle nut which is connected to a guide tube. By rotating the spindle the length of the adjustment is altered and, as a result, the seat kinematics attached to both ends is brought into the desired adjusted position. The height adjuster is subjected to tensile forces in the event of a front impact and to compressive forces in the event of a rear impact. In the case of a high compressive load in a rear impact, a fastening means, in particular a screw, covers a defined path by the deformation of a bending element and a deformation element in the direction of an opposing first point of attachment of the linear adjuster to the seat structure. By this targeted deformation, a portion of the impact energy is destroyed by shape alteration and thus the load on the occupant is reduced.

The difficulty of ensuring a targeted deformation is that the deformation may only begin above a defined load threshold. No plastic deformation is able to take place in normal use of the vehicle seat and with the forces produced thereby. When a trigger load threshold is exceeded, the deformation is intended to take place over a defined path and above a level of force which is as consistent as possible. This object has been achieved by, on the one hand, a deformation element being provided for the targeted dissipation of the energy and also a bending element for the targeted introduction of the dissipated energy. After reaching a bending load, the attachment means or a bushing are moved by means of the lamellae of the deformation plate and shape alteration is carried out by the bending of the individual lamellae.

The deformation element preferably has deformable zones and/or individual elements which are successively subjected to load and are deformable and optionally may also become detached. As a result, a long deformation path is possible. By the functional separation of the deformation region in the bending element and the deformation element both the trigger threshold of the energy dissipation and the load level and the path of the deformation may be adjusted structurally.

The deformation element and the bending element may be designed as individual parts with different material thicknesses and strengths or even as a one-piece solution. An essential feature of the invention is the functional separation between the bending and the subsequent deformation.

A high wave as the predetermined bending point on the bending element relative to the material thickness is advantageous relative to the tolerance of the trigger threshold, since production tolerances and assembly tolerances may have less impact in this case. In uniform structures the shaping of the deformation element may be designed for a force level which is as consistent as possible during the deformation. Alternatively, different deformation cross sections which permit a progressive or degressive force path curve are also possible. A reinforcing plate is optionally able to be used when the cross section of the bending element is not sufficient for the operating state, i.e. the bending element is too soft.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
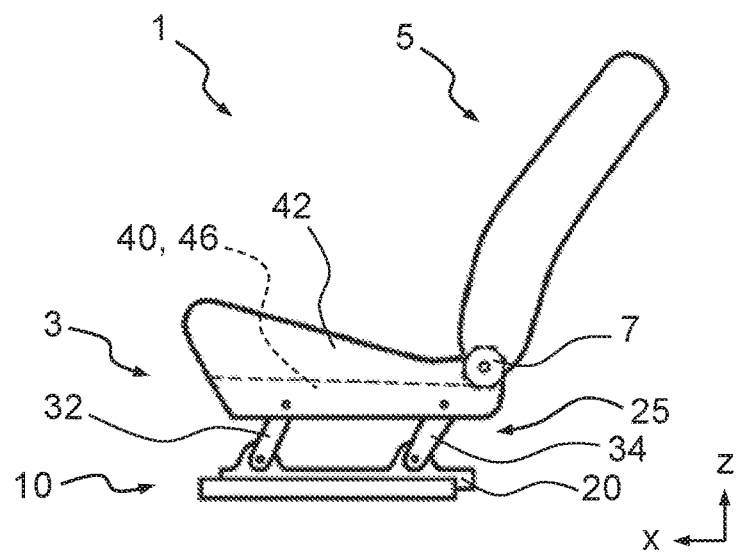
FIG. 1 is a schematic side view of a vehicle seat.
Figure 2:
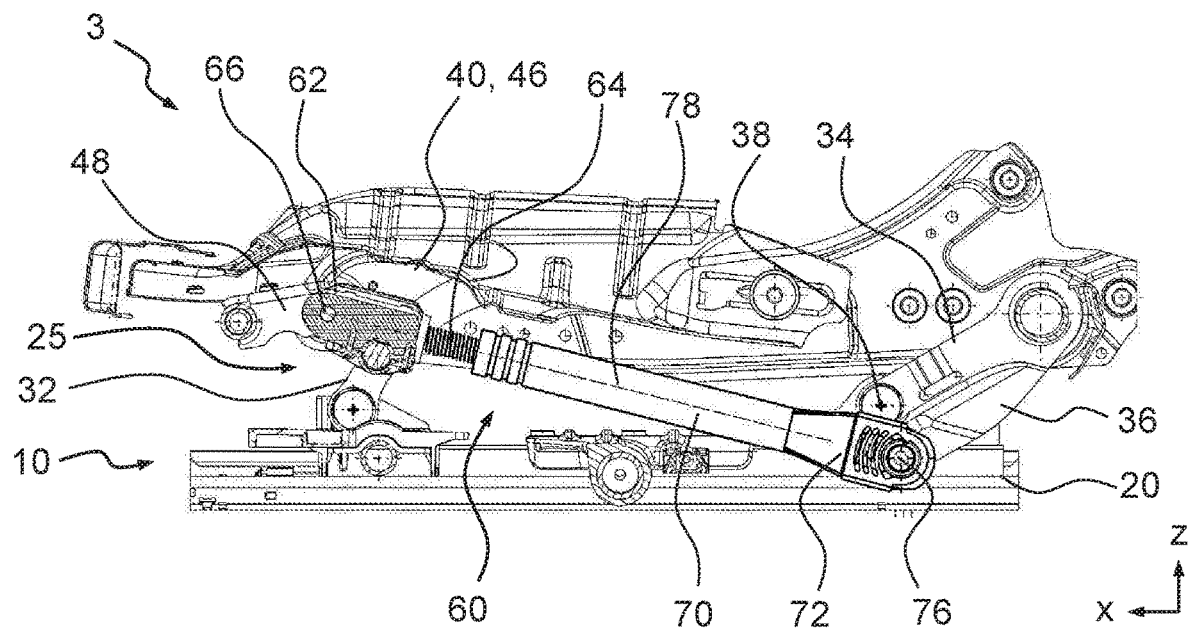
FIG. 2 is a side view of a vehicle seat with a four link arrangement as a height adjuster and a control drive with an energy absorber according to the invention.
Figure 3:
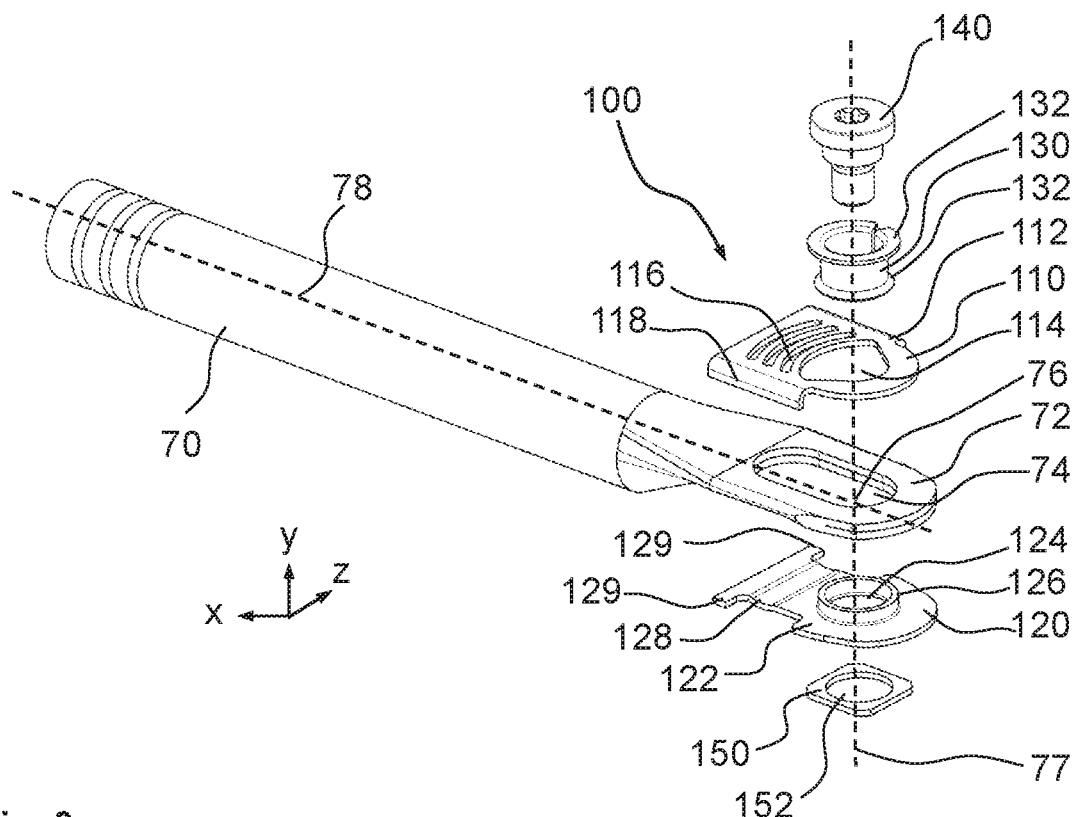
FIG. 3 is an exploded view of an energy absorber according to the invention.
Figure 4:
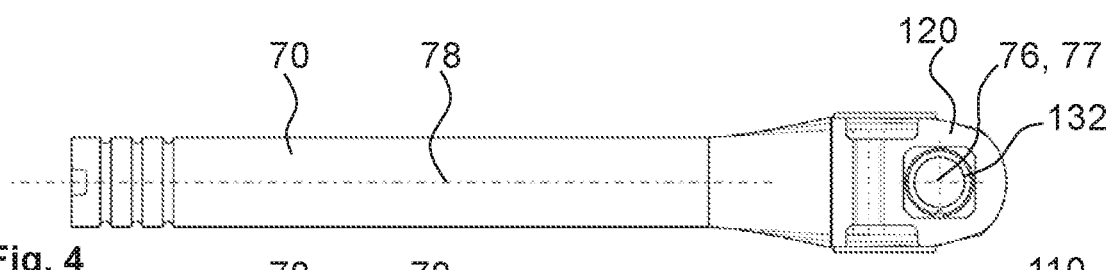
FIG. 4 is a bottom view of the energy absorber of FIG. 3.
Figure 5:
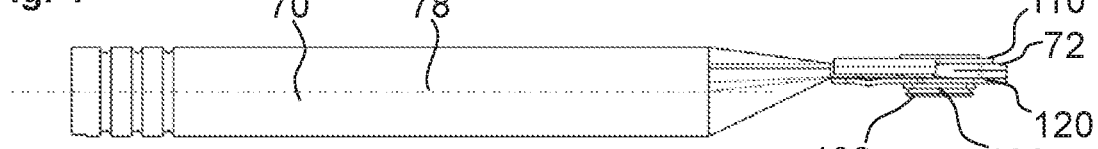
FIG. 5 is a side view of the energy absorber of FIG. 3.
Figure 6:
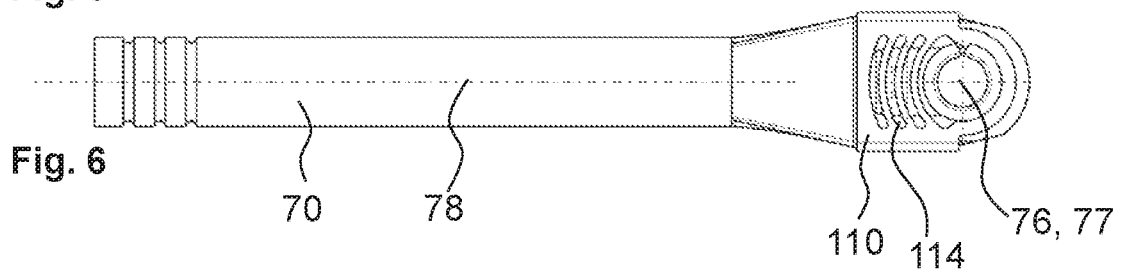
FIG. 6 is a plan view of the energy absorber of FIG. 3.

Referring to the drawings, a vehicle seat 1 shown schematically in FIG. 1, in particular for a motor vehicle, is described hereinafter by using three spatial directions extending perpendicular to one another. In a vehicle seat 1 installed in a vehicle, a longitudinal direction x extends substantially horizontally and preferably parallel to a vehicle longitudinal direction which corresponds to the usual direction of travel of the vehicle. A transverse direction y extending perpendicular to the longitudinal direction x is also aligned horizontally in the vehicle and extends parallel to a vehicle transverse direction. A vertical direction z extends perpendicular to the longitudinal direction x and perpendicular to the transverse direction y. In a vehicle seat 1 installed in the vehicle, the vertical direction z extends parallel to the vehicle vertical axis.

The positional and directional information used, such as for example front, rear, top and bottom refer to a viewing direction of an occupant seated in the vehicle seat 1 in the normal seating position, wherein the vehicle seat 1 is installed in the vehicle in a position of use which is capable of conveying passengers with an upright backrest 5 and oriented in the direction of travel, as is usually the case. The vehicle seat 1 according to the invention, however, may also be installed in a different orientation, for example transversely to the direction of travel.

The vehicle seat 1 has a seat substructure 3 and a backrest 5. The backrest 5 is connected on both sides by means of one respective fitting 7 to the seat substructure 3. The seat substructure 3 is able to be fastened by a base 10, in the present case two rail pairs 20, to the vehicle floor of the motor vehicle. A height adjusting kinematics 25 of the vehicle seat 1 has in each case on both vehicle seat sides a four link arrangement 25, often also denoted in the prior art as a quadrilateral linkage. The four link arrangement 25 comprises in each case on both seat sides the base 10, a front rocker 32, a rear rocker 34 and a side part 46 of a seat frame 40 which in each case are connected together by means of joints to the four link arrangement 25.

Apart from the two side parts 46 the seat frame 40 additionally has a front crossmember and a rear crossmember. The two side parts 46, the front crossmember and the rear crossmember are fixedly connected together to the seat frame 40, preferably welded thereto. The seat frame 40 additionally bears a seat cushion 42 and in the present case also the backrest 5. By means of the height adjusting kinematics 25 the height of the seat cushion 42 and the backrest 5 of the vehicle seat 1 are able to be adjusted above the vehicle floor and thus above the base 10.

A linear adjuster which is configured as a control drive 60 serves for an electrical adjustment of the height adjusting kinematics 25 and thus an adjustment of the height of the seat cushion 42 above the base 10.

The control drive 60 is designed as a spindle drive which is driven by means of a gear motor 62. The control drive 60 is a linear adjuster, the spacing being able to be adjusted thereby between a first point of articulation 66 and a second point of articulation 76, wherein the two points of articulation 66, 76 move in a substantially linear manner relative to one another.

The control drive 60 alters its length when the gear motor 62 is actuated. The gear motor 62 is arranged so as to be oriented in parallel with the front crossmember and in the immediate vicinity thereof. The gear motor 62 is connected in an articulated manner to the front crossmember by means of a bearing block 48 in a first point of articulation 66, in the present case pivotably connected about a first pivot axis parallel to the transverse direction y. To this end, two bearing eyes are fastened to the front crossmember. The bearing eyes protrude counter to the longitudinal direction x to the rear. The gear motor 62 drives a spindle 64 in an actuated, i.e. switched-on, state in a manner known per se. The spindle 64 is in engagement with a spindle nut which is fixedly inserted in the interior of a drive tube 70. As a result, this leads to a relative movement between the gear motor 62 and the drive tube 70 when the spindle 64 is rotated by the gear motor 62. The spindle 64 is screwed into the drive tube 70 or screwed out of the drive tube thereby, depending on the rotational direction. As a result, the control drive 60 alters its length.

The drive tube 70 has a flattened end region 72 remote from the gear motor 62. In this end region 72, the drive tube 70 is flattened and configured in a planar manner. The end region 72 has an elongated hole 74 which is oriented parallel to an imaginary connecting line between the first point of articulation 66 and the second point of articulation 76. The direction of this imaginary connecting line is hereinafter denoted as the effective direction 78.

One of the two rear rockers 34 is connected to a drive adapter 36, in the present case welded thereto. The drive adapter 36 is connected in an articulated manner by means of a load limiting device 100, described in more detail hereinafter, to the end region 72 of the drive tube 70, so that the drive tube 70 is pivotably connected in the second point of articulation 76 about a second axis of articulation 77 to the drive adapter 36. The second axis of articulation 77 extends parallel to the transverse direction y. The rear rocker 34 which is connected to the drive adapter 36 is connected in an articulated manner in a bearing part to an upper rail of the right-hand rail pair 20, and namely pivotably about a lower rocker axis 38. The lower rocker axis 38 extends parallel to the transverse direction y. The lower rocker axis 38 and the second axis of articulation 77 are at a distance from one another so that the rear rocker 34 may be driven via the drive adapter 36. Thus an alteration to the length of the control drive 60 causes the rear rocker 34 to be driven, whereby the height of the vehicle seat 1 is altered.

An energy absorber 100 acting as a load limiter is arranged in the end region 72 of the control drive 60. The effect of the energy absorber 100 is that a compressive force which is able to be transmitted via the control drive 60 between the first point of articulation 66 and the second point of articulation 76 is limited to a maximum load.

The energy absorber 100 has a deformation element 110, a bending element 120, a bushing 130, a fastening means 140, which is configured in the present case as a screw, and a reinforcing plate 150. The components including the bushing 130 and the reinforcing plate 150 are optional and not essential to the invention.

The deformation element 110 is preferably produced from a steel plate but may also be produced from a different deformable material. The deformation element 110 has a planar base body 112 which extends in the effective direction 78 and parallel to the end region 72 of the drive tube 70. The base body 112 has an opening 114. A center point of the surface of the opening 114 is arranged approximately in the effective direction 78. The base body 112 has three slots 116 which in the present case are curved about the second axis of articulation 77. The three slots 116 form between one another lamellae. The three slots 116 weaken the base body 112 such that it is deformable in a targeted manner. The deformation behavior of the deformation element 110 may be structurally influenced by the shape of the slots 116, the number of slots 116 and the material and the material thickness of the deformation element 110. The base body 112 has in each case on both sides extending parallel to the effective direction 78 a limb 118 which protrudes perpendicularly from the base body 112.

The bending element 120 is preferably produced from a steel plate but may also be produced from a different deformable material. The bending element 120 has a planar base body 122 which extends in the effective direction 78 and parallel to the end region 72 of the drive tube 70. Viewed in the effective direction 78, the base body 122 has eccentrically a circular opening 124 which is surrounded by a collar 126. The collar 126 faces in the direction of the deformation element 110. A center point of the surface of the opening 124 is arranged approximately in the effective direction 78 and adjacent to the elongated hole 74. In an outer region of the base body 122 remote from the opening 124 this base body comprises in each case on two opposing edge regions a lug 129 which protrudes approximately perpendicularly from the effective direction 78, in opposing directions from the base body 122. A predetermined bending point 128 is arranged between the opening 124 and the lugs 129. The predetermined bending point 128 in the present case is configured as a recess in the base body 122 of the bending element 120. The predetermined bending point 128 is a recess with a circular segment-shaped cross section. The predetermined bending point 128 extends perpendicularly to the effective direction 78. The opening 124 is arranged on one side of the predetermined bending point 128. The lugs 129 are arranged on the opposing side.

The predetermined bending point 128 is designed such that, upon achieving a bending load acting on the bending element 120, the bending element 120 bends. According to the principles of engineering mechanics known per se, "bending" is understood in this case as a loss of stability of the bending element 120 with an abrupt deformation of the base body 122 acting as a pressure rod under the action of a compressive force, when the compressive force reaches or exceeds a bending load.

Viewed in the transverse direction y the end region 72 of the drive tube 70 is arranged between the deformation element 110 and the bending element 120. The openings 114, 124 of the deformation element 110 and the bending element 120 receive the elongated hole 74 between one another. A circular cylindrical bushing 130 penetrates the openings 114, 124 of the deformation element 110 and the bending element 120 and the elongated hole 74. The bushing 130 has in each case at its two ends a radially outwardly facing flange 132. One flange 132 bears partially against the base body 112 of the deformation element 110. The other flange bears against the reinforcing plate 150, which is positioned on the side of the bending element 120 remote from the end region 72 and has a corresponding through-hole 152 for the bushing 130. The elongated hole 74 is dimensioned and arranged such that in the direction of the first point of articulation 66 the bushing 130 has freedom of movement inside the elongated hole 74.

By means of a fastening means 140 which is configured as a screw and which passes through the bushing 130, the bushing 130 and thus the control drive 60 are attached to the drive adapter 36 of the seat substructure 3. To this end, the drive adapter 36 has an internal thread, in particular a weld nut.

The two lugs 129 of the bending element 120 are connected to the end region 72 of the drive tube 70, in the present case welded thereto. Additionally, the two limbs 118 of the deformation element 110 are connected, in the present case welded, to the end region 72 of the drive tube 70.

When the bending element 120 is bent, the lugs 129 remain fixed relative to the end region 72 due to the connection to the end region 72, whilst the opening 124 and therewith the bushing 130 are displaced in the direction of the lugs 129. As a result, the deformation element 110 is deformed by the conversion of kinetic energy into deformation energy.

The features disclosed in the above description, the claims and the drawings may be of significance both individually and also in combination with one another for implementing the invention in the various embodiments thereof.

While specific embodiments of the invention have been shown and described in detail to illustrate the application of the principles of the invention, it will be understood that the invention may be embodied otherwise without departing from such principles.

The invention claimed is:

1. A linear adjuster for a vehicle seat comprising at least one energy absorber, the at least one energy absorber comprising:
    a deformation element deformable by forces occurring in a vehicle collision; and
    a bending element which releases the deformation element, wherein, upon achieving a bending load acting on the bending element, the bending element bends and the bending element thereby releases the deformation element to a lesser extent;
    wherein the linear adjuster has a first point of articulation and a second point of articulation, wherein the spacing between the first point of articulation and the second point of articulation is adjustable;
    wherein the at least one energy absorber comprises one energy absorber that is arranged in a region of the first point of articulation and one further energy absorber that is arranged in a region of the second point of articulation of the linear adjuster.

2. The linear adjuster as claimed in claim 1, wherein the at least one energy absorber is arranged in a region of the first point of articulation or in a region of the second point of articulation of the linear adjuster.

3. A vehicle seat having at least one linear adjuster, the at least one linear adjuster comprising at least one energy absorber, the at least one energy absorber comprising:
    a deformation element deformable by forces occurring in a vehicle collision; and a bending element which releases the deformation element, wherein, upon achieving a bending load acting on the bending element, the bending element bends and the bending element thereby releases the deformation element to a lesser extent;

wherein the linear adjuster has a first point of articulation and a second point of articulation, wherein the spacing between the first point of articulation and the second point of articulation is adjustable;

wherein the at least one energy absorber comprises:

one energy absorber arranged in a region of the first point of articulation; and one further energy absorber arranged in a region of the second point of articulation of the linear adjuster.

4. The vehicle seat as claimed in claim 3, wherein the at least one energy absorber is arranged in a region of the first point of articulation or in a region of the second point of articulation of the linear adjuster.

5. The vehicle seat as claimed in claim 3, wherein the bending element has a predetermined bending point comprising a recess in a base body of the bending element.

6. The vehicle seat as claimed in claim 3, wherein the deformation element comprises a base body with means for a targeted deformation of the base body comprising a slot.

* * * * *